United States Patent
Pang et al.

(10) Patent No.: US 12,197,792 B1
(45) Date of Patent: Jan. 14, 2025

(54) LOGICAL BACK-END DEVICE ENTRY-BASED SLICE WRITE DESTAGE

(71) Applicant: Dell Products, L.P., Hopkinton, MA (US)

(72) Inventors: Lixin Pang, Needham, MA (US); Rong Yu, West Roxbury, MA (US)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/401,645

(22) Filed: Jan. 1, 2024

(51) Int. Cl.
*G06F 3/00* (2006.01)
*G06F 3/06* (2006.01)

(52) U.S. Cl.
CPC .......... *G06F 3/0689* (2013.01); *G06F 3/061* (2013.01); *G06F 3/0631* (2013.01)

(58) Field of Classification Search
CPC ....... G06F 3/0689; G06F 3/061; G06F 3/0631
See application file for complete search history.

(56) References Cited

U.S. PATENT DOCUMENTS

2022/0229589 A1\* 7/2022 Pang ............... G06F 3/0689

\* cited by examiner

*Primary Examiner* — Craig S Goldschmidt
(74) *Attorney, Agent, or Firm* — Anderson Gorecki LLP (57) ABSTRACT

In a storage system where Front-End (FE) tracks do not correspond to Back-End (BE) tracks on a one-to-one basis, a Logical Entry (LE) table is implemented in the BE processes to enable masking to occur on BE Logical Entry values rather than on BE tracks. An LE watch table is used to correlate LE values with BE tracks. When a RAID slice destage is initiated to move data from the FE tracks to BE tracks implementing the RAID slice, the LE watch table is used to identify a respective set of LE values that correspond to each respective RAID slice BE track. Entries of the BE mask corresponding to the LE values identified from the LE watch table are used to identify FE tracks that contain data to be included in the RAID slice destage. Metadata is retrieved for each identified FE track, and the RAID slice destage is implemented.

14 Claims, 7 Drawing Sheets

LOGICAL BACK-END DEVICE ENTRY-BASED SLICE WRITE DESTAGE

FIELD

This disclosure relates to computing systems and related devices and methods, and, more particularly, to a method and apparatus for RAID slice write destage to back-end storage resources according to logical back-end device entry masking.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for RAID slice write destage to back-end storage resources is provided that implements slice-based destage operations according to logical back-end device entry masking. In some embodiments, write operations are stored on front-end tracks that do not map one-to-one to back-end tracks of storage resources. When back-end storage resources are protected using a RAID construct, such as 5+1 RAID, it is advantageous to destage data from the front-end tracks to back-end tracks according to RAID slice, by implementing all destage operations on a given RAID slice as a group such that all write IOs on the RAID slice are moved as a group from the front-end tracks to the back-end tracks.

In some storage systems, multiple front-end tracks can map to a given back-end track, or a given front-end track can map to more than one back-end track. Additionally, in some storage systems, destage operations are managed by back-end storage resources. For example, in some embodiments if a given FE track maps to at least a portion of a BE track, a mask bit is set for the BE track such that, during a slice write destage operation, FE metadata for all tracks that map to the BE track will be obtained and then any FE track that is write pending will be destaged to the corresponding BE track. In some instances, this can result in redundant and unnecessary metadata inquiries, which wastes system resources, increases IO latency, and can lead to performance issues. Further, the fact that there isn't a one-to-one mapping between FE track and BE track can lead to inconsistencies in the BE mask, which can result in BE destage failures.

According to some embodiments, write pending information on tracks of a BE RAID slice are organized using a Logical Entry (LE) table organized on the BE tracks of the slice. A LE based mask is used to identify corresponding FE tracks that are write pending on the BE tracks of the slice. A LE watch table is used to correlate LE values with BE tracks. When a RAID slice destage is initiated, the BE tracks of the slice read the LE watch table to identify respective sets of LE values, and determine from the LE-based mask for identified LE values which FE track has data that is owed to the BE tracks. Metadata access operations are then initiated by the BE on the set of FE tracks that contain data to be destaged. Since there is one-to-one correspondence between FE tracks and the BE mask, excessive metadata read operations are avoided. Since there is a one-to-one mapping between FE track and BE LE values of the BE table, inconsistencies in the BE mask are less likely to occur, thus resulting in fewer BE destage failures.

In some embodiments, a method of destaging data to back-end storage resources, includes implementing a set of front-end tracks in global memory of a storage system and a set of back-end tracks in back-end storage resources of the storage system, the front-end tracks not corresponding on a one-to-one basis with the back-end tracks, the back-end storage resources being organized in a (Redundant Array of Inexpensive Disks) RAID configuration in which sets of back-end tracks form slices of the RAID configuration, implementing a Logical Entry (LE) table in the back-end processes of the storage system, the LE table having a respective LE value for each respective front-end track, implementing a back-end mask by the back-end processes of the storage system, the back-end mask identifying front-end tracks that have data to be destaged to back-end storage resources of the storage system, the back-end mask including a bit for each LE value of the LE table, and implementing a LE watch table by the back-end processes of the storage system, the LE watch table correlating LE values of the LE table with corresponding back-end tracks. The method also includes implementing a RAID slice destage operation by the back-end processes of the storage system, the RAID slice destage operation by identifying a set of back-end tracks included in the RAID slice of the RAID configuration to receive data during the RAID slice destage operation, for each back-end track included in the RAID slice, identifying a set of LE values associated with the back-end track from the LE watch table, and for each identified LE value in the set of LE values, identifying from the back-end mask whether a corresponding front-end track contains data to be included in the RAID slice destage operation.

In some embodiments, implementing the RAID slice destage operation by the back-end processes further includes, in response to determining that a corresponding FE track contains data to be included in the RAID slice destage operation, reading metadata for the corresponding FE tracks identified using the LE values and destaging data from the corresponding FE tracks to the BE tracks implementing the RAID slice of the RAID configuration. In some embodiments, the RAID slice destage operation implements movement of all FE tracks having write data to the BE tracks implementing the RAID slice of the RAID configuration as a group destage operation.

In some embodiments, the back-end mask is a bit map having a respective corresponding bit for each LE value of the LE table, the bits of the bit map corresponding on a one-to-one basis with the LE values of the LE table.

In some embodiments, the LE values of the LE table correspond on a one-to-one basis with the front-end tracks.

In some embodiments, the LE values of the LE table do not correspond on a one-to-one basis with the back-end tracks.

In some embodiments, the method further includes comprising receiving a write IO on a given front-end track, receiving the data of the write IO into the global memory, mapping the front-end track to a given LE value of the LE table, and setting a corresponding bit of the back-end mask for the given LE value.

In some embodiments, a system for destaging data to back-end storage resources, includes one or more processors and one or more storage devices storing instructions that are operable, when executed by the one or more processors, to cause the one or more processors to perform operations including implementing a set of front-end tracks in global memory of a storage system and a set of back-end tracks in back-end storage resources of the storage system, the front-end tracks not corresponding on a one-to-one basis with the back-end tracks, the back-end storage resources being organized in a (Redundant Array of Inexpensive Disks) RAID configuration in which sets of back-end tracks form slices of the RAID configuration, implementing a Logical Entry (LE) table in the back-end processes of the storage system, the LE table having a respective LE value for each respective front-end track, implementing a back-end mask by the back-end processes of the storage system, the back-end mask identifying front-end tracks that have data to be destaged to back-end storage resources of the storage system, the back-end mask including a bit for each LE value of the LE table, and implementing a LE watch table by the back-end processes of the storage system, the LE watch table correlating LE values of the LE table with corresponding back-end tracks. The operations also include implementing a RAID slice destage operation by the back-end processes of the storage system, the RAID slice destage operation by identifying a set of back-end tracks included in the RAID slice of the RAID configuration to receive data during the RAID slice destage operation, for each back-end track included in the RAID slice, identifying a set of LE values associated with the back-end track from the LE watch table, and for each identified LE value in the set of LE values, identifying from the back-end mask whether a corresponding front-end track contains data to be included in the RAID slice destage operation.

In some embodiments, implementing the RAID slice destage operation by the back-end processes further includes, in response to determining that a corresponding FE track contains data to be included in the RAID slice destage operation, reading metadata for the corresponding FE tracks identified using the LE values and destaging data from the corresponding FE tracks to the BE tracks implementing the RAID slice of the RAID configuration. In some embodiments, the RAID slice destage operation implements movement of all FE tracks having write data to the BE tracks implementing the RAID slice of the RAID configuration as a group destage operation.

In some embodiments, the back-end mask is a bit map having a respective corresponding bit for each LE value of the LE table, the bits of the bit map corresponding on a one-to-one basis with the LE values of the LE table.

In some embodiments, the LE values of the LE table correspond on a one-to-one basis with the front-end tracks.

In some embodiments, the LE values of the LE table do not correspond on a one-to-one basis with the back-end tracks.

In some embodiments, the operations further include receiving a write IO on a given front-end track, receiving the data of the write IO into the global memory, mapping the front-end track to a given LE value of the LE table, and setting a corresponding bit of the back-end mask for the given LE value.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic"

is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
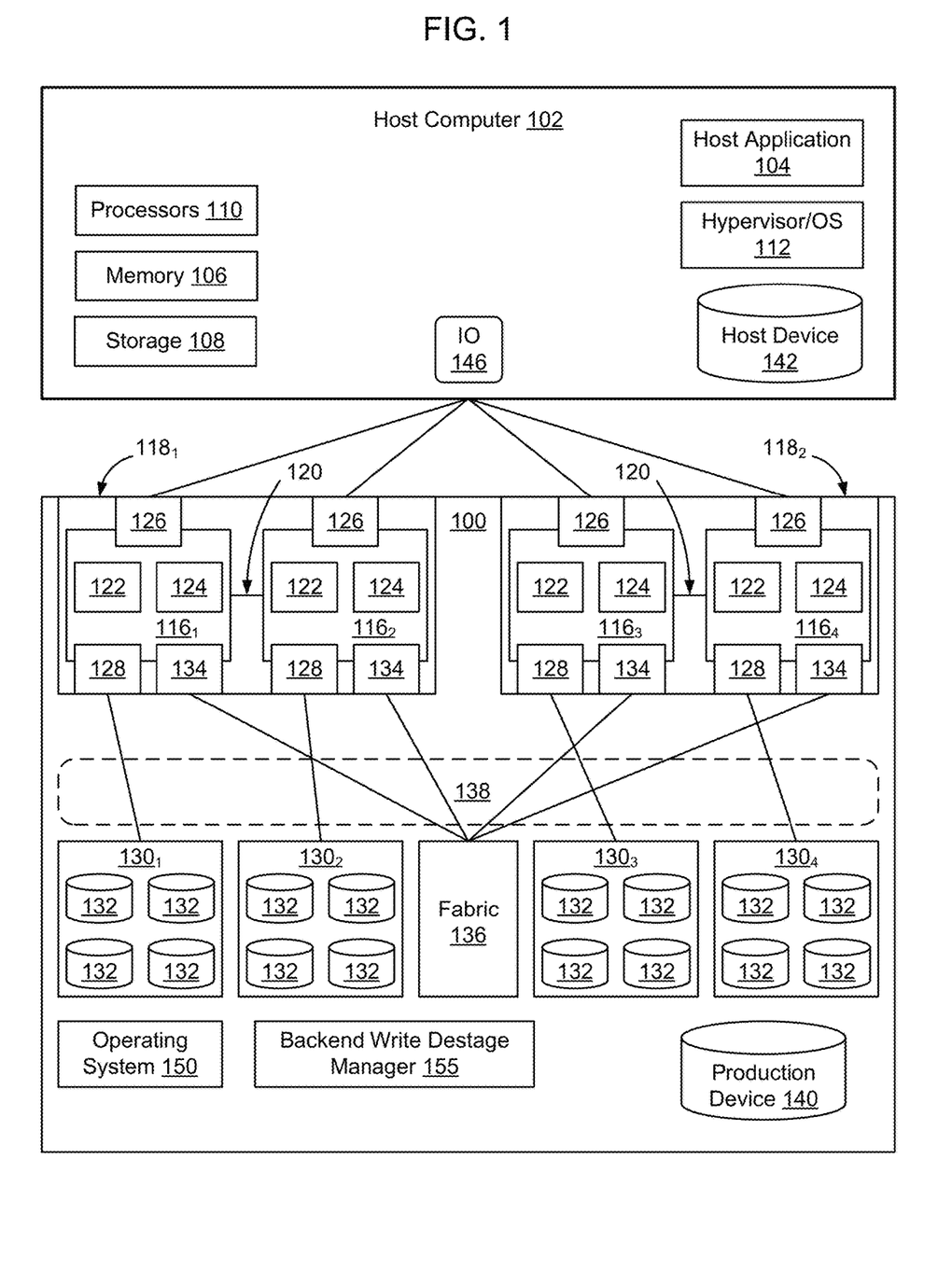
FIG. 1 is a functional block diagram of a host computer connected to an example storage system having a backend write destage manager configured to implement RAID slice write destage to back-end storage resources according to logical back-end device entry masking, according to some embodiments.

FIG. 1 is a functional block diagram of a host computer connected to an example storage system having DIF enabled compression hardware, according to some embodiments. FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132. In some embodiments, as shown in FIG. 1, the storage system includes a backend write destage manager 155 that coordinates destaging data from shared global memory 138 to backend storage resources 132.

Figure 2:
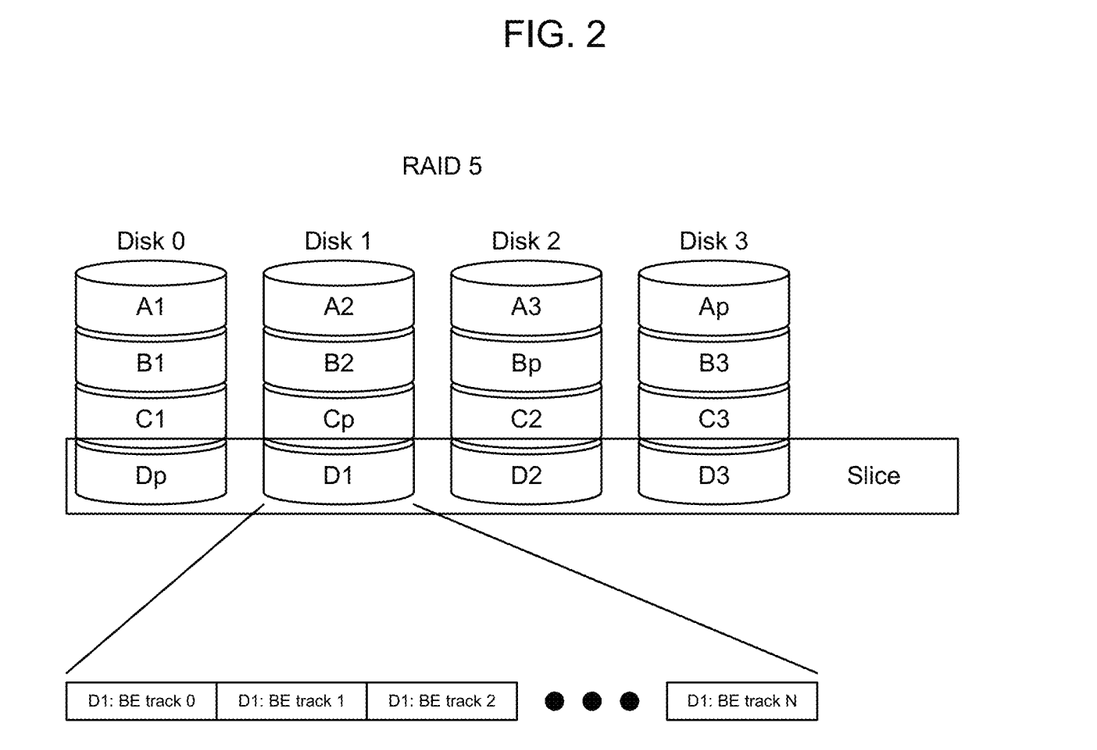
FIG. 2 is a block diagram of an example Redundant Array of Independent Disks (RAID) configuration, according to some embodiments.

Back End (BE) storage resources such as managed drives 132 can be organized to prevent data loss in the event of failure of one or more of the managed drives 132. One way to organize the managed drives 132 is to organize the managed drives using RAID configurations. FIG. 2 is a block diagram of an example Redundant Array of Independent Disks (RAID) configuration, according to some embodiments. There are many RAID configurations, which use the techniques of striping, mirroring, or parity, to create large reliable data stores from multiple general-purpose computer hard disk drives. Although FIG. 2 shows an example RAID 5 configuration, in which Parity is distributed throughout the RAID configuration in each stripe, it should be understood that there are other RAID configurations as well and that the invention is not limited to use with the particular RAID configuration shown in FIG. 2. Rather, FIG. 2 shows an example RAID configuration to help illustrate some environments in which the techniques described herein may be applicable.

As shown in FIG. 2, in some embodiments a given RAID configuration will have multiple stripes, each of which is referred to herein as a "slice". When write IO operations are received at the storage system that are to be stored in back-end storage resources that are organized using a particular RAID configuration, the write IO operations may be immediately destaged to the back-end storage resources or, alternatively, may be held for a period of time in shared global memory 138 prior to being destaged to back-end storage resources 132. For efficiency, it is sometimes advantageous to hold the writes on a given slice in front-end storage resources for a period of time and then destage all write operations on a given slice as a group to the back-end storage resources. This can result in certain back-end efficiencies, as well as potentially resulting in write hit IO on the front-end, which may occur where the host writes data to the same location two or more times before the data is able to be destaged to the back-end storage resources.

As used herein, the term "destaged" is used to refer to a process of moving data from global memory 138 to back-end storage resources 132. As noted above, when a write IO is received from a host, a slot of global memory 138 will be allocated to receive the data associated with the write IO. After the data is stored in the slot of global memory 138, the data will be "destaged" to back-end storage resources 132. As shown in FIG. 2, a given allocation of storage on a given disk of a RAID slice may include a portion of each of a plurality disks, with each disk portion including a plurality of tracks. In FIG. 2, the tracks of disc 1 that are used on that disk to implement a particular RAID slice are shown, it should be understood that each of disks 0, 2 and 3 similarly include allocations of tracks to implement their respective portion of the RAID slice.

Figure 3A:
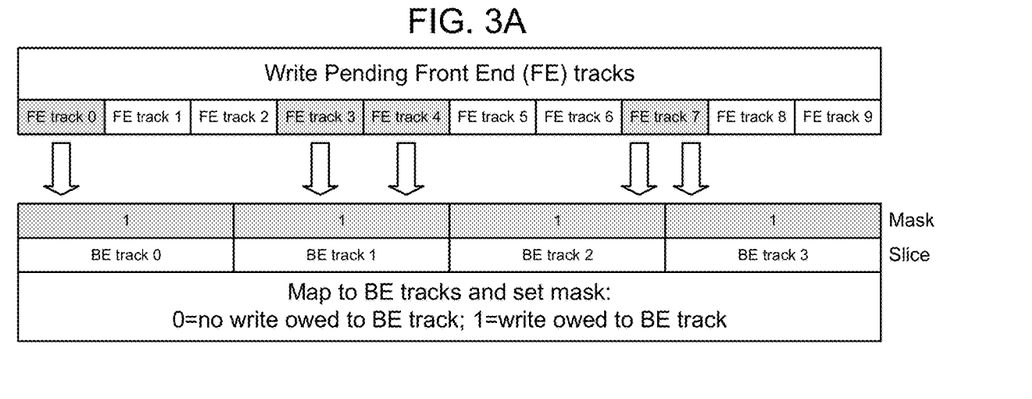
FIGS. 3A-3C are block diagrams showing an example problem that can occur in instances where front-end tracks of the storage system are not mapped on a one-to-one basis to back-end tracks of the storage system, when implementing a RAID-slice based destage operation, according to some embodiments.
Figure 3B:
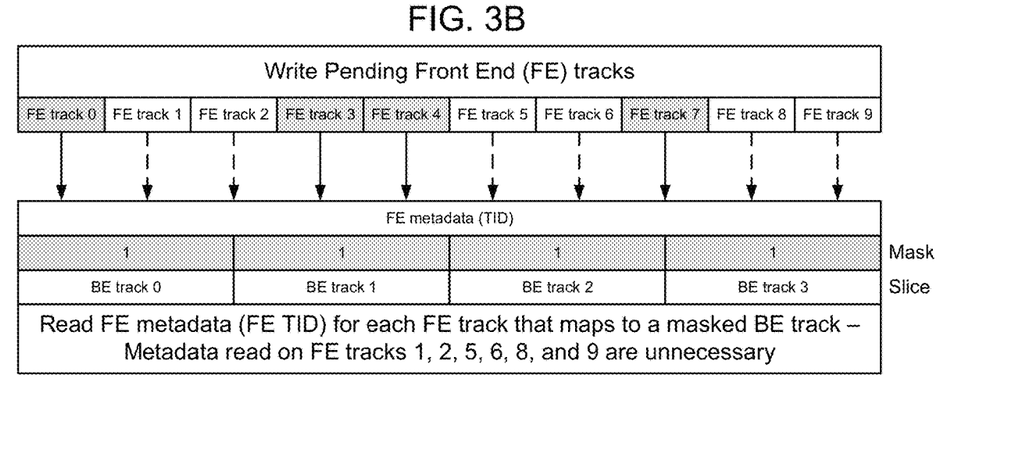
Figure 3C:
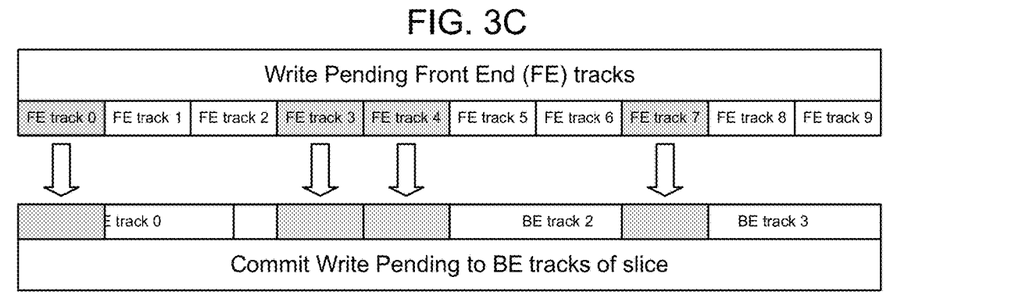

FIGS. 3A-3C are block diagrams showing an example problem that can occur in instances where front-end tracks of the storage system are not mapped on a one-to-one basis to back-end tracks of the storage system, when implementing a RAID-slice based destage operation, according to some embodiments. As shown in FIG. 3A, in some embodiments storage systems are configured such that there is not a one-to-one correspondence between front-end tracks and back-end tracks. Specifically, in some embodiments when a write IO is received from a host, the slot of global memory that is allocated to store the data associated with the write IO is selected from one of a plurality of sizes. Example sizes might be, for example, 16 Kb, 32 Kb, 64 Kb, and 128 Kb, although other slot sizes might be used as well depending on the particular implementation. Back-end tracks, by contrast, might all be provisioned to have the same track size, such as 128 KB, although other BE track sizes might be used depending on the implementation.

As shown in FIG. 3A, in some embodiments the storage system back-end processes such as backend write destage manager 155, which manage back-end storage resources 132, are responsible for destaging data from the front-end tracks to the back-end tracks. In FIG. 3A, the front-end tracks are labeled FE track 0 to FE track 9, and the back-end tracks are labeled BE track 0 to BE track 3. It should be understood that there may be multiple front-end tracks and multiple back-end tracks, and that the particular selection of tracks in FIG. 3A is shown merely for purposes of illustration.

To enable the BE processes to manage destage operations, in some embodiments the storage system is designed to enable the BE processes to keep track of which back-end tracks are owed data by the front-end tracks. For example, in some embodiments the BE processes maintain a mask, in which any time a write occurs on a front-end track that contains data that will need to be written to a back-end track, the bit is set in the BE mask for the BE track. An example mask might be implemented, for example as a bit mask, in which each BE track is represented by a single bit in the BE mask.

For example, in FIG. 3A it is assumed that four separate host write IOs have occurred on FE track 0, FE track 3, FE track 4, FE track 7 (shown using grey boxes in FIG. 3A). Data for FE track 0 will be destaged to BE track 0. Accordingly, the bit in the BE mask for BE track 0 has been set to the value 1 in FIG. 3A. Likewise, FE tracks 3 and 4 both will be destaged to BE track 1 and, accordingly, the bit in the BE mask for BE track 1 has been set to the value of 1. FE track 7, when destaged is stored in portions of BE tracks 2 and 3. Accordingly, the write on FE track 7 causes the bit in the BE mask to be set to the value of 1 for both BE track 2 and BE track 3.

As shown in FIG. 3B, when a decision is made to implement a RAID slice destage, the back-end processes use the BE mask to determine which back-end tracks are owed data by one or more FE tracks. The lack of one-to-one correlation between the back-end track and front-end track, however, means that the back-end processes don't know which FE track contains the data that needs to be written to the corresponding back-end track. Accordingly, as shown in FIG. 3B, each BE track performs a metadata read on all of its corresponding FE tracks to determine which of the FE tracks contains data to be destaged to back-end storage resources 132. This results in unnecessary metadata read operations on FE tracks. Specifically, in the Example shown in FIG. 3B, unnecessary metadata read operations are implemented on FE tracks 1, 2, 5, 6, 8, and 9 (shown using dashed arrows). Implementing unnecessary metadata read operations wastes system resources, such as compute cycles and bandwidth, which can negatively affect IO processing time by the storage system.

As shown in FIG. 3C, once the back-end processes have completed the metadata read operations, the back-end processes are able to destage data from the front-end tracks to back-end storage resources, thus completing the destage process. The BE mask entries for the destaged back-end tracks are then reset to 0 and the destage operation ends.

Figure 4A:
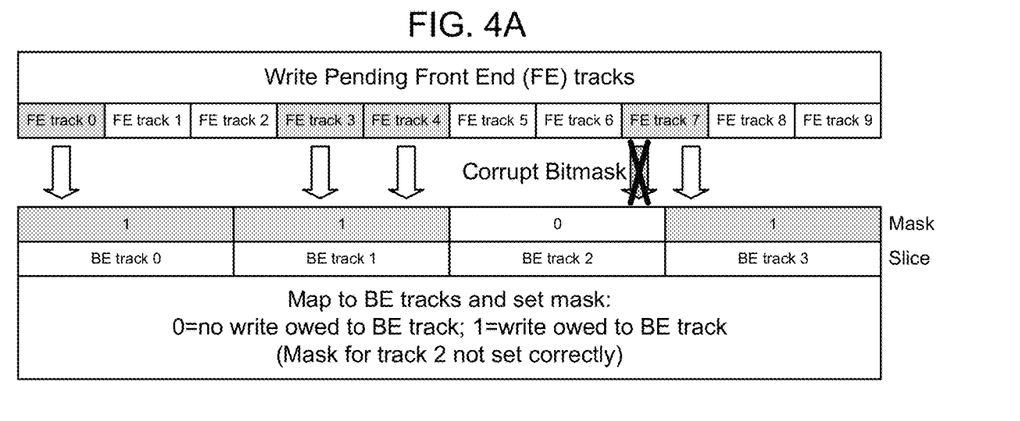
FIGS. 4A-4C are block diagrams showing another example problem that can occur in instances where front-end tracks of the storage system are not mapped on a one-to-one basis to back-end tracks of the storage system, when implementing a RAID-slice based destage operation, according to some embodiments.
Figure 4B:
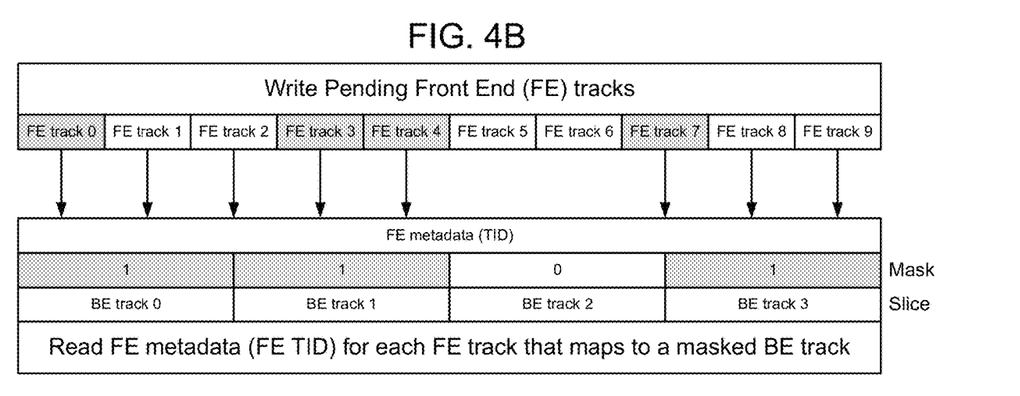
Figure 4C:
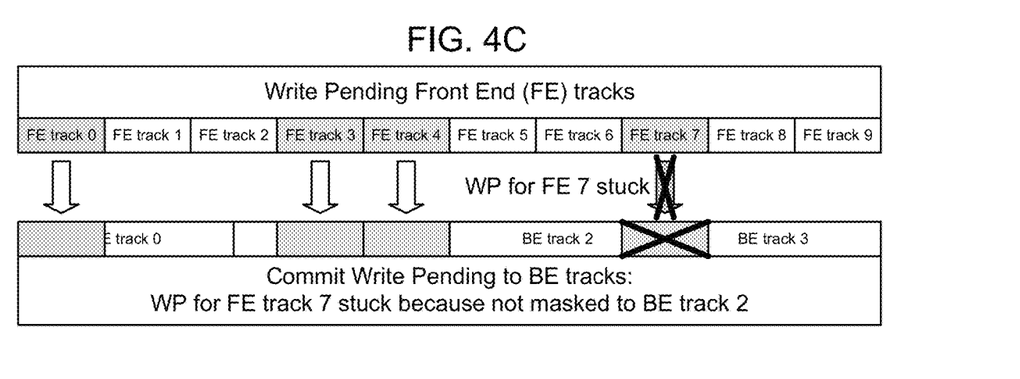

FIGS. 4A-4C are block diagrams showing another example problem that can occur in instances where front-end tracks of the storage system are not mapped on a one-to-one basis to back-end tracks of the storage system, when implementing a RAID-slice based destage operation, according to some embodiments. As shown in FIG. 4A, in embodiments where there is not a one-to-one mapping between front end track and back-end track, it is possible for the back-end mask to be corrupted, such that a write to a FE track might cause the bit for one back-end track to be set but to not cause the bit for the other back-end track to be set in the BE mask. For example, in FIG. 4A a write has occurred on FE track 7 which needs to be destaged to both BE track 2 and BE track 3. The BE mask has been incorrectly updated, however, such that the bit in the BE mask for BE track 2 is not set to 1.

As shown in FIG. 4B, when a destage is initiated, the BE mask is used to determine which BE tracks are owed data from one or more of the FE tracks. In this instance, the bit for BE track 2 was not set in the BE mask, even though a portion of the data from FE track 7 will need to be stored in BE track 2. Accordingly, as shown in FIG. 4C, the back-end processes responsible for destaging data to the set of BE tracks will not include BE track 2 in the destage process, causing the write pending for FE track 7 to become stuck. Accordingly, in instances where a given FE track might map to multiple BE tracks, there is a greater likelihood of a BE mask corruption which can delay or prevent the destage process, possibly even leading to a condition where the data becomes unavailable.

Figure 5A:
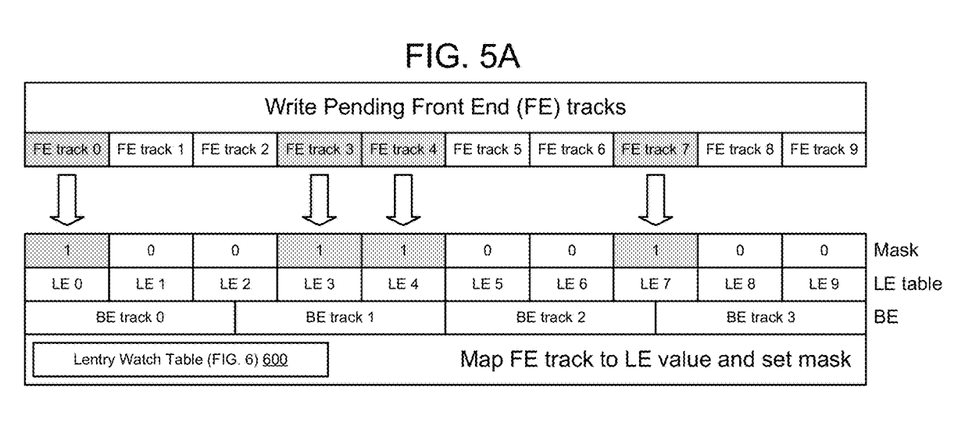
FIGS. 5A-5C are block diagrams showing a process of implementing RAID slice write destage to back-end storage resources according to logical back-end device entry masking to avoid the problems of FIGS. 3A-3C and 4A-4C, in a storage system in which the front-end tracks of the storage system do not map on a one-to-one basis to back-end tracks of the storage system, according to some embodiments.
Figure 5B:
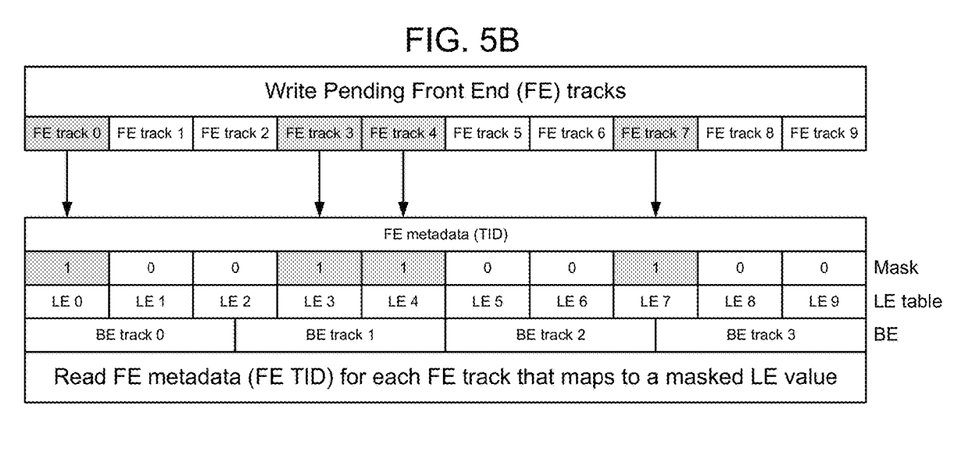
Figure 5C:
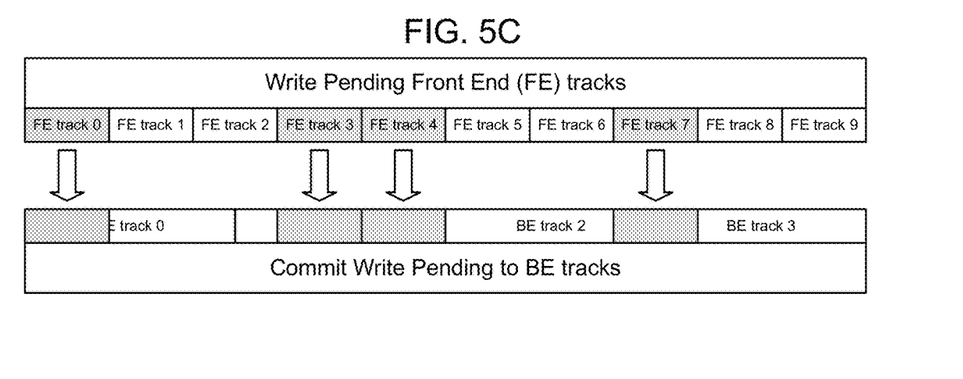

FIGS. 5A-5C are block diagrams showing a process of implementing RAID slice write destage to back-end storage resources according to logical back-end device logical entry masking to avoid the problems of FIGS. 3A-3C and 4A-4C, in a storage system in which the front-end tracks of the storage system to not map on a one-to-one basis to back-end tracks of the storage system, according to some embodiments.

As shown in FIG. 5A, in some embodiments a Logical Entry (LE) table is created in the back-end processes. The LE table includes LE values which correspond on a one-on-one basis to respective front-end tracks. A mask is implemented that includes a bit for each LE value in the LE table. A LE watch table is created that maps BE tracks to corresponding LE values of the LE table. An example data structure configured to implement the LE watch table is described in greater detail in connection with FIG. 6.

When a write occurs on a FE track, the corresponding LE value in the LE table is identified, and a mask bit for the LE value is set in the BE mask. Accordingly, for example as shown in FIG. 5A, in this example write IOs have occurred on FE tracks 0, 3, 4, and 7, and the BE mask bits for LE values 0, 3, 4, and 7 have correspondingly been set to 1. Although FIG. 5A shows the LE values as having the same numerical value as the corresponding FE track, there is no requirement for correspondence of this nature as any LE values may be used depending on the implementation.

As shown in FIG. 5A, when a determination is made to destage write pending front end tracks for a given RAID slice, the back-end processes determine a set of BE tracks that correspond to the given RAID slice and then seek to determine which corresponding FE tracks have data that needs to be destaged to the identified set of BE tracks. As shown in FIG. 5A, in some embodiments to determine which FE tracks have data that needs to be destaged to the set of BE tracks corresponding to the RAID slice, the back-end processes read the BE mask for the LE values corresponding to the BE tracks, and determine that mask bits have been set for LE values 0, 3, 4, and 7. Since each LE corresponds on a one-to-one basis with a respective FE track, as shown in FIG. 5B, the back-end processes are able to implement metadata read operations only for FE tracks 0, 3, 4, and 7, since it is possible to directly identify these FE tracks from the BE mask. Stated differently, as shown in FIG. 5B, by masking at the LE value level, rather than the BE track level, it is possible for the back-end processes to directly identify FE tracks that contain data to be destaged, to thereby reduce the number of metadata access operations. After reading the metadata for the set of front-end tracks associated with the back-end RAID slice destage operation, the data from the FE tracks is destaged to the BE tracks, as shown in FIG. 5C.

Figure 6:
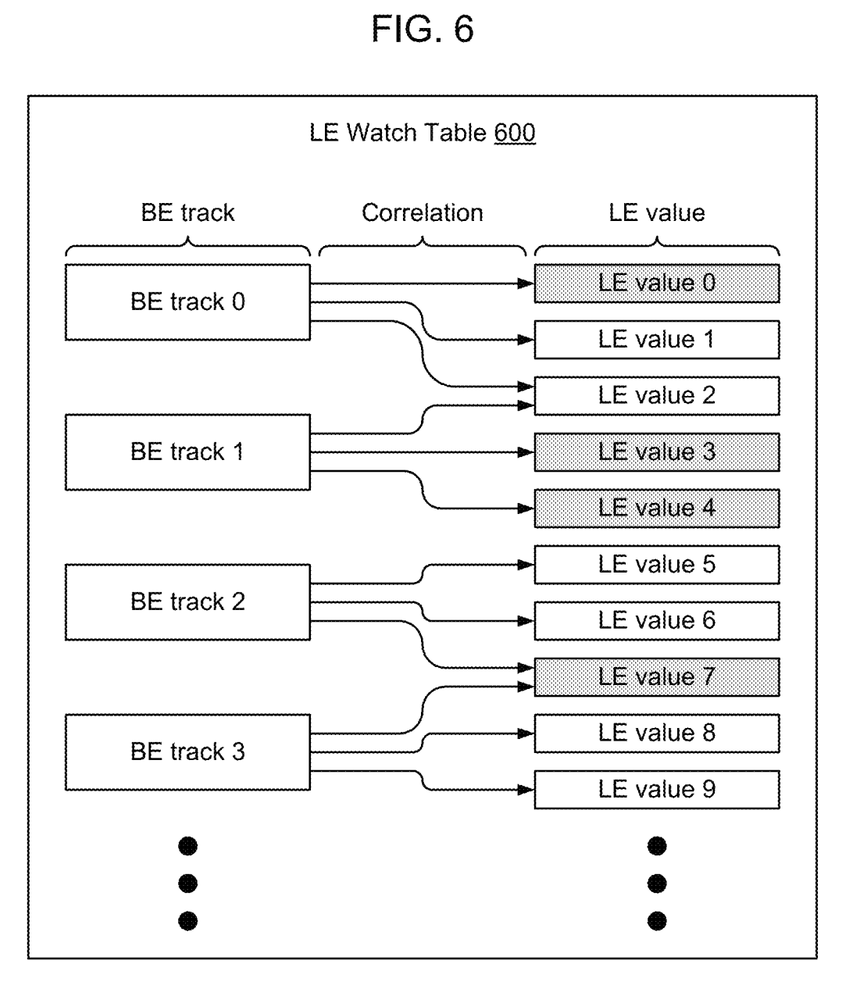
FIG. 6 is a block diagram of an example data structure configured to implement a LE watch table for use in the process shown in FIGS. 5A-5C to correlate back-end tracks with LE values, according to some embodiments.

As shown in FIG. 5A, in some embodiments there is not a correlation between the LE values and BE tracks. To determine a correlation between BE tracks and LE values, in some embodiments a LE watch table 600 is used to enable sets of LE values to be determined for the BE tracks. FIG. 6 is a block diagram of an example data structure configured to implement a LE watch table 600 for use in the process shown in FIGS. 5A-5C to correlate back-end tracks with LE values, according to some embodiments. As shown in FIG. 6, in some embodiments as FE tracks are created that map to BE tracks, corresponding LE values are created and added to the LE watch table 600. The LE watch table 600 contains an association between LE values and BE tracks, which enables a query to be implemented to identify a set of LE values that are associated with a given BE track, or to identify a set of BE tracks that are associated with a given LE value.

For example, in FIG. 5A, bits in the BE mask entries for LE values 0, 3, 4, and 7 are set, indicating that there are corresponding FE tracks that contain data to be destaged. From LE watch table 600, it is possible to determine that LE value 0 has a correlation with BE track 0. Similar correlations are able to be determined for LE values 3, 4, and 7. As shown in FIG. 6, a given LE value may map to a single BE track, as is the case with LE values 0, 1, 3, 4, 5, 6, 8, and 9. Likewise, a given LE value may map to more than one BE track, as is the case for LE values 2 and 7. However, the fact that a given LE value may map to more than one BE track does not give rise to the possibility of having a corrupt mask. Specifically, as shown in FIG. 5A, since there is a one-to-one correspondence between FE track and LE value, the BE mask is implemented on the LE values, and whenever a write IO occurs on a given FE track, the write IO causes a single change to the BE mask for the BE mask bit that corresponds with the LE value for the FE track, thus reducing the possibility that the BE mask will become corrupted.

Accordingly, when a set of BE tracks is selected that correspond to a RAID slice, in some embodiments the LE watch table is used to identify a set of LE values that correspond to the set of BE tracks of the RAID slice. The BE mask values for the set of LE values are then read to identify a set of FE tracks that have write data that needs to be moved (destaged) to the set of BE tracks of the RAID slice. Metadata for the identified set of FE tracks is then read, to enable the FE tracks to be destaged as a group to the RAID slice.

Figure 7:
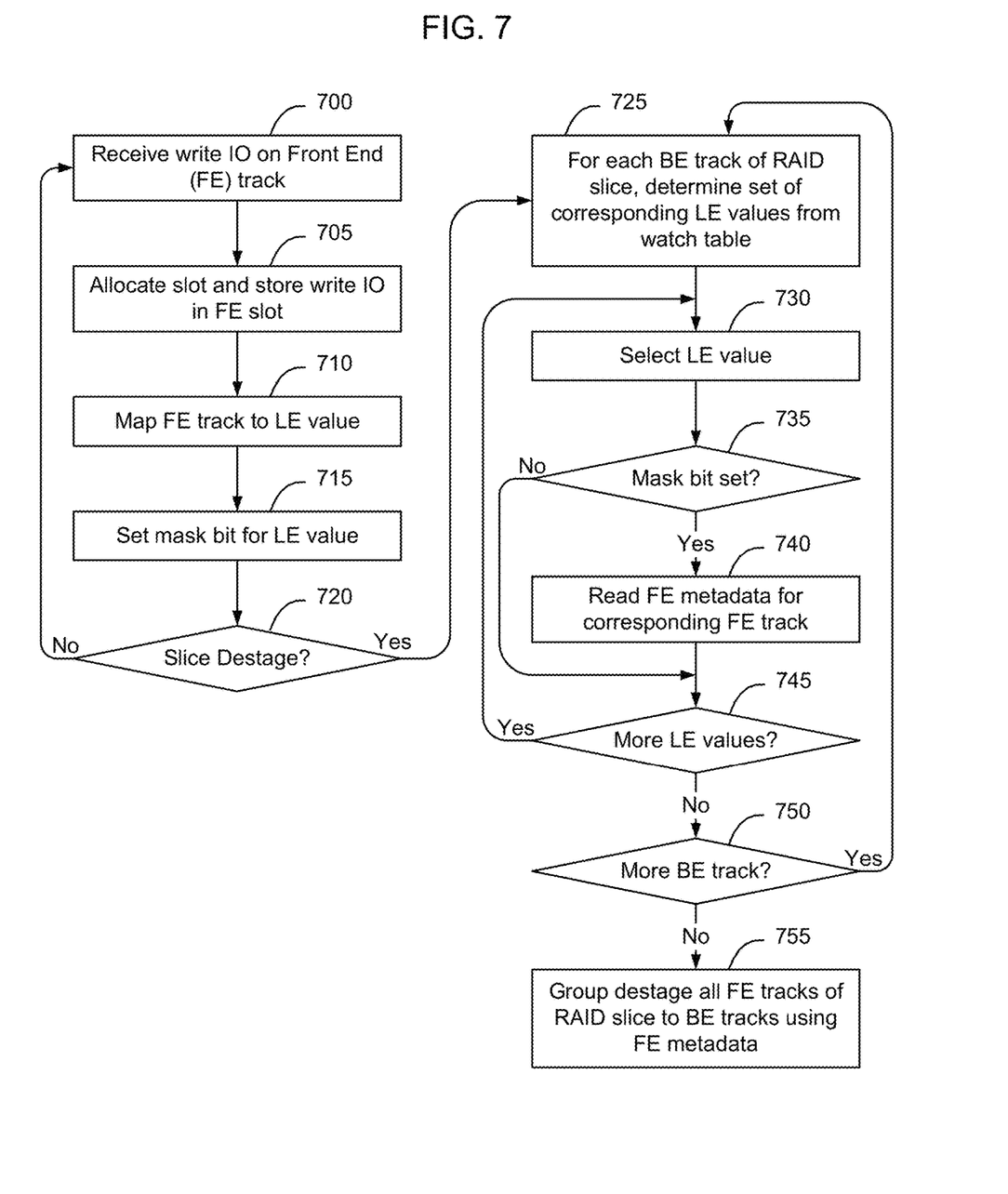
FIG. 7 is a flowchart of an example process of RAID slice write destage to back-end storage resources, according to some embodiments.

FIG. 7 is a flowchart of an example process of RAID slice write destage to back-end storage resources, according to some embodiments. As shown in FIG. 7, in some embodiments, when a write IO is received on a front end track at the front end processes of a storage system (block 700), a FE slot is allocated to the write IO and the write IO is stored in the FE slot (block 705). The FE track is then mapped to a LE value of the Back-End (BE) processes (block 710), and a mask bit in the BE mask that corresponds to the LE value is set (block 715).

A determination is then made as to whether to implement a slice destage to a RAID group implemented in BE storage resources (block 720). While a slice destage is not implemented (a determination of NO at block 720), the front-end continues to receive and implement writes on FE tracks (blocks 700, 705, 710, 715). In response to a determination to implement a slice destage to a RAID group of BE storage resources (a determination of YES at block 720), a destage thread implemented as part of the back-end processes on the storage system will determine a set of corresponding LE values for each respective BE track of the RAID slice (block 725). In some embodiments, a LE watch table is used to identify a respective set of LE values for each BE track.

A given LE value is then selected (block 730), and a determination is made as to whether the BE mask bit is set for the LE value in the BE mask (block 735). In response to a determination that the BE mask bit is set for the LE value (a determination of YES at block 735), the destage thread reads the FE metadata for the FE track that corresponds to the LE value (block 740). In response to a determination that the BE mask bit is not set for the LE value (a determination of NO at block 735), or after reading the FE metadata for the FE track that corresponds to the LE value (block 740), a determination is made if there are more LE values (block 745). In response to a determination that there are more LE values to process (a determination of YES at block 745), the process returns to block 730 where another LE value is selected. The process shown in blocks 730, 735, and 740 iterates until there are no additional LE values for the selected BE track (a determination of NO at block 745).

In response to a determination that there are no additional LE values for the selected BE track (a determination of NO at block 745), the BE thread determines if there are additional BE tracks associated with the RAID slice to be processed (block 750). In response to a determination that there are additional BE tracks associated with the RAID slice to be processed (a determination of YES at block 750), the process returns to block 725 where another BE track is selected.

The process shown in blocks 725-750 iterates until there are no additional BE tracks to be processed (a determination of NO at block 750). In response to a determination that there are no additional BE tracks to be processed (a determination of NO at block 750), the destage thread implements a group destage of all FE tracks of the RAID slice to the BE tracks using the metadata collected for each of the FE tracks in block 740 (block 755).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of destaging data to back-end storage resources, comprising:
    implementing a set of front-end tracks in global memory of a storage system and a set of back-end tracks in back-end storage resources of the storage system, the front-end tracks not corresponding on a one-to-one basis with the back-end tracks, the back-end storage resources being organized in a (Redundant Array of Inexpensive Disks) RAID configuration in which sets of back-end tracks form slices of the RAID configuration;

implementing a Logical Entry (LE) table in the back-end processes of the storage system, the LE table having a respective LE value for each respective front-end track;

implementing a back-end mask by the back-end processes of the storage system, the back-end mask identifying front-end tracks that have data to be destaged to back-end storage resources of the storage system, the back-end mask including a bit for each LE value of the LE table;

implementing a LE watch table by the back-end processes of the storage system, the LE watch table correlating LE values of the LE table with corresponding back-end tracks;

implementing a RAID slice destage operation by the back-end processes of the storage system, the RAID slice destage operation comprising:

identifying a set of back-end tracks included in the RAID slice of the RAID configuration to receive data during the RAID slice destage operation;

for each back-end track included in the RAID slice, identifying a set of LE values associated with the back-end track from the LE watch table; and for each identified LE value in the set of LE values, identifying from the back-end mask whether a corresponding front-end track contains data to be included in the RAID slice destage operation.

2. The method of claim 1, wherein implementing the RAID slice destage operation by the back-end processes further comprises:

in response to determining that a corresponding FE track contains data to be included in the RAID slice destage operation, reading metadata for the corresponding FE tracks identified using the LE values and destaging data from the corresponding FE tracks to the BE tracks implementing the RAID slice of the RAID configuration.

3. The method of claim 2, wherein the RAID slice destage operation implements movement of all FE tracks having write data to the BE tracks implementing the RAID slice of the RAID configuration as a group destage operation.

4. The method of claim 1, wherein the back-end mask is a bit map having a respective corresponding bit for each LE value of the LE table, the bits of the bit map corresponding on a one-to-one basis with the LE values of the LE table.

5. The method of claim 1, wherein the LE values of the LE table correspond on a one-to-one basis with the front-end tracks.

6. The method of claim 1, wherein the LE values of the LE table do not correspond on a one-to-one basis with the back-end tracks.

7. The method of claim 1, further comprising receiving a write IO on a given front-end track;

receiving the data of the write IO into the global memory;

mapping the front-end track to a given LE value of the LE table; and setting a corresponding bit of the back-end mask for the given LE value.

8. A system for destaging data to back-end storage resources, comprising:

one or more processors and one or more storage devices storing instructions that are operable, when executed by the one or more processors, to cause the one or more processors to perform operations comprising:

implementing a set of front-end tracks in global memory of a storage system and a set of back-end tracks in back-end storage resources of the storage system, the front-end tracks not corresponding on a one-to-one basis with the back-end tracks, the back-end storage resources being organized in a (Redundant Array of Inexpensive Disks) RAID configuration in which sets of back-end tracks form slices of the RAID configuration;

implementing a Logical Entry (LE) table in the back-end processes of the storage system, the LE table having a respective LE value for each respective front-end track;

implementing a back-end mask by the back-end processes of the storage system, the back-end mask identifying front-end tracks that have data to be destaged to back-end storage resources of the storage system, the back-end mask including a bit for each LE value of the LE table;

implementing a LE watch table by the back-end processes of the storage system, the LE watch table correlating LE values of the LE table with corresponding back-end tracks;

implementing a RAID slice destage operation by the back-end processes of the storage system, the RAID slice destage operation comprising:

identifying a set of back-end tracks included in the RAID slice of the RAID configuration to receive data during the RAID slice destage operation;

for each back-end track included in the RAID slice, identifying a set of LE values associated with the back-end track from the LE watch table; and for each identified LE value in the set of LE values, identifying from the back-end mask whether a corresponding front-end track contains data to be included in the RAID slice destage operation.

9. The system of claim 8, wherein implementing the RAID slice destage operation by the back-end processes further comprises:

in response to determining that a corresponding FE track contains data to be included in the RAID slice destage operation, reading metadata for the corresponding FE tracks identified using the LE values and destaging data from the corresponding FE tracks to the BE tracks implementing the RAID slice of the RAID configuration.

10. The system of claim 9, wherein the RAID slice destage operation implements movement of all FE tracks having write data to the BE tracks implementing the RAID slice of the RAID configuration as a group destage operation.

11. The system of claim 8, wherein the back-end mask is a bit map having a respective corresponding bit for each LE value of the LE table, the bits of the bit map corresponding on a one-to-one basis with the LE values of the LE table.

12. The system of claim 8, wherein the LE values of the LE table correspond on a one-to-one basis with the front-end tracks.

13. The system of claim 8, wherein the LE values of the LE table do not correspond on a one-to-one basis with the back-end tracks.

14. The system of claim 8, the operations further comprising receiving a write IO on a given front-end track;

receiving the data of the write IO into the global memory;

mapping the front-end track to a given LE value of the LE table; and setting a corresponding bit of the back-end mask for the given LE value.

\* \* \* \* \*